United States Patent
Iyer et al.

(10) Patent No.: US 9,600,235 B2
(45) Date of Patent: Mar. 21, 2017

(54) TECHNIQUE FOR PERFORMING ARBITRARY WIDTH INTEGER ARITHMETIC OPERATIONS USING FIXED WIDTH ELEMENTS

(71) Applicant: NVIDIA CORPORATION, Santa Clara, CA (US)

(72) Inventors: Srinivasan Iyer, Austin, TX (US); Michael Alan Fetterman, Boxborough, MA (US); David Conrad Tannenbaum, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 172 days.

(21) Appl. No.: 14/026,829

(22) Filed: Sep. 13, 2013

(65) Prior Publication Data
US 2015/0081753 A1    Mar. 19, 2015

(51) Int. Cl.
*G06F 7/38*     (2006.01)
*G06F 7/525*    (2006.01)

(52) U.S. Cl.
CPC ...... *G06F 7/525* (2013.01); *G06F 2207/3824* (2013.01)

(58) Field of Classification Search
CPC ....................................................... G06F 7/525
USPC ................................................ 708/620, 625
See application file for complete search history.

(56) References Cited

U.S. PATENT DOCUMENTS

| | | | | |
|---|---|---|---|---|
| 5,586,070 A * | 12/1996 | Purcell | ................. | G06F 7/5324 708/620 |
| 5,999,959 A * | 12/1999 | Weng | ...................... | G06F 7/724 708/492 |
| 6,460,064 B1 * | 10/2002 | Lee | ........................ | G06F 7/5338 708/518 |
| 6,523,055 B1 * | 2/2003 | Yu | ......................... | G06F 7/5443 708/603 |
| 6,915,322 B2 * | 7/2005 | Hong | ....................... | G06T 1/20 708/620 |
| 7,085,798 B2 * | 8/2006 | Kim | ........................ | G06F 7/508 708/714 |
| 7,318,080 B2 * | 1/2008 | Berkeman | ............. | G06F 7/5324 708/625 |
| 7,519,646 B2 * | 4/2009 | Kaul | ..................... | G06F 7/5324 708/620 |
| 7,908,308 B2 * | 3/2011 | Haller | ..................... | G06F 7/507 708/714 |
| 2002/0143841 A1 * | 10/2002 | Farooqui | ................ | G06F 7/507 708/714 |

* cited by examiner

*Primary Examiner* — Tan V. Mai
(74) *Attorney, Agent, or Firm* — Artegis Law Group, LLP (57) ABSTRACT

One embodiment of the present invention includes a method for performing arithmetic operations on arbitrary width integers using fixed width elements. The method includes receiving a plurality of input operands, segmenting each input operand into multiple sectors, performing a plurality of multiply-add operations based on the multiple sectors to generate a plurality of multiply-add operation results, and combining the multiply-add operation results to generate a final result. One advantage of the disclosed embodiments is that, by using a common fused floating point multiply-add unit to perform arithmetic operations on integers of arbitrary width, the method avoids the area and power penalty of having additional dedicated integer units.

21 Claims, 5 Drawing Sheets

TECHNIQUE FOR PERFORMING ARBITRARY WIDTH INTEGER ARITHMETIC OPERATIONS USING FIXED WIDTH ELEMENTS

BACKGROUND OF THE INVENTION

Field of the Invention

Embodiments of the present invention relate generally to computer processing and, more specifically, to a technique for performing arbitrary width integer arithmetic operations using fixed width elements.

Description of the Related Art

In computer systems, in general, and in graphics processing units (GPUs), in particular, a great number of arithmetic operations are performed on both floating point numbers and integer numbers. Floating point numbers are typically 32 bits in width. The 24 least significant, or right-most, bits, referred to as the mantissa, represent the value of the number, and the 8 most significant, or left-most, bits represent the exponent. A minimal element of floating point arithmetic is called a fused floating point multiply-add (FFMA), which performs the function of multiplying two inputs and adding a third input to the resulting product. An FFMA unit first performs the multiply operation on the mantissas of the two inputs and shifts the product according to the relative value of the exponents prior to performing the final addition using the third mantissa.

To accommodate the 24 bit values of the two inputs, the multiplier in the FFMA is 24 bits wide. Signed and unsigned integer numbers are typically 32 bits wide, where all 32 bits represent the value of the integer. In order to perform the basic multiply-add function on 32 bit integer inputs, a 32 bit multiplier is required. When it is required to perform both floating point and integer arithmetic in a computer system or GPU, past implementations have often relied on a dedicated 32 bit multiplier add element to perform integer arithmetic in addition to conventional FFMA elements. Alternatively, the multiplier in a conventional FFMA can be augmented to be 32 bits wide, with the additional 8 bits gated off when the FFMA is performing 24 bit multiplications.

One drawback to the above approach is that the addition of dedicated 32 bit multipliers incurs an undesirable increase in the required microcircuit real estate in the system as well as an increased leakage and overhead power loss as the increased size entails longer connecting wires and the resulting increased resistive and capacitive losses. Alternatively, increasing the size of the FFMA multiplier to 32 bits allows a common element to be used for both floating point and integer operations but suffers from the same drawbacks, in that real estate usage and overhead power is increased even if unused bit portions are gated off during floating point operations.

As the foregoing illustrates, what is needed in the art is a more effective approach to performing integer and floating point arithmetic operations.

SUMMARY OF THE INVENTION

One embodiment of the present invention includes a method for performing arithmetic operations on arbitrary width integers using fixed width elements. The method includes receiving a plurality of input operands, segmenting each input operand into multiple sectors, performing a plurality of multiply-add operations based on the multiple sectors to generate a plurality of multiply-add operation results, and combining the multiply-add operation results to generate a final result.

One advantage of the disclosed approach is that the system performs integer arithmetic operations using an existing fused floating point multiply-add element, obviating the need for substantial additional dedicated hardware. This more efficient use of existing elements allows saving in both dynamic power and overhead leakage power. In addition, the disclosed approach allows the FFMA element to perform arithmetic operations on integers of arbitrary width via multiple, software-directed cycles through the FFMA, thus expanding the capability of the unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
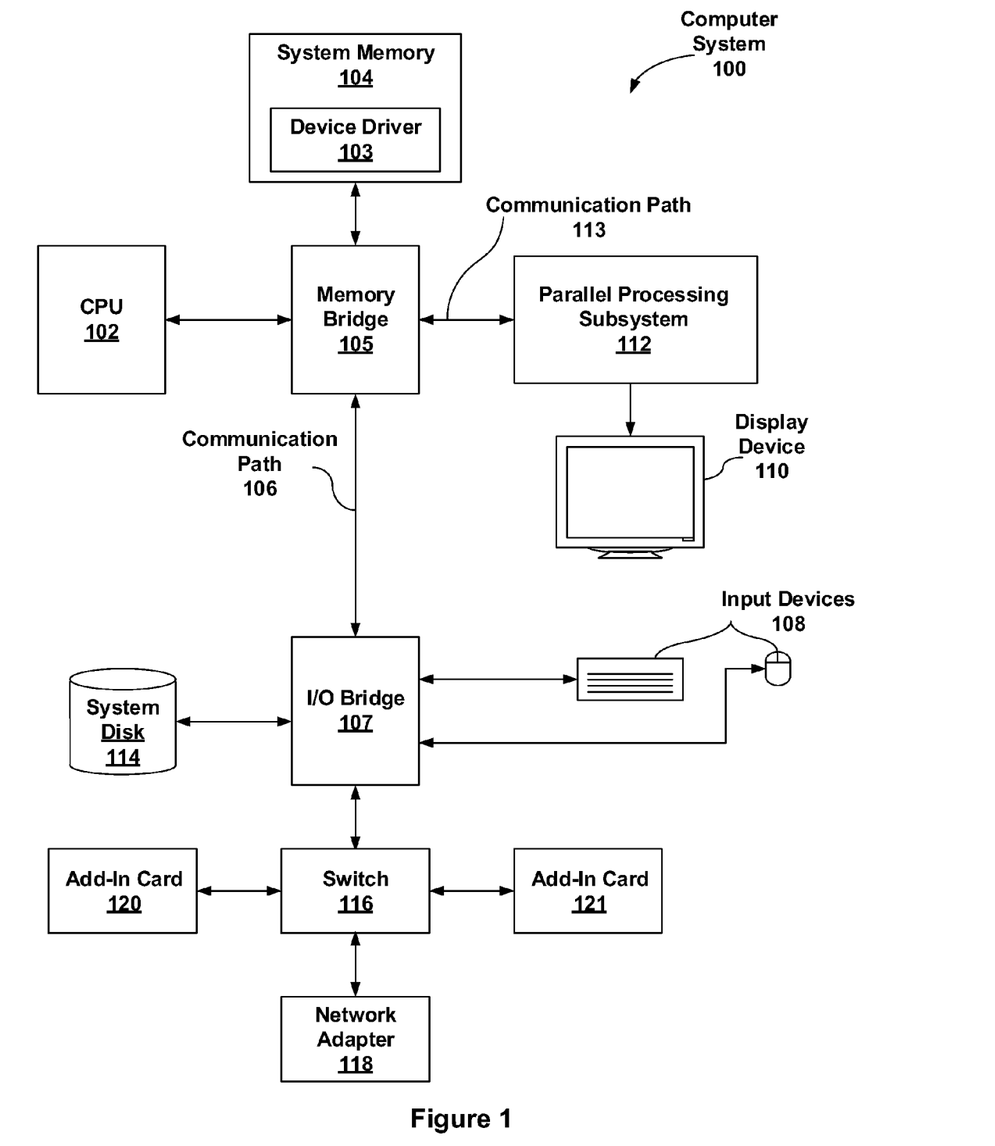
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
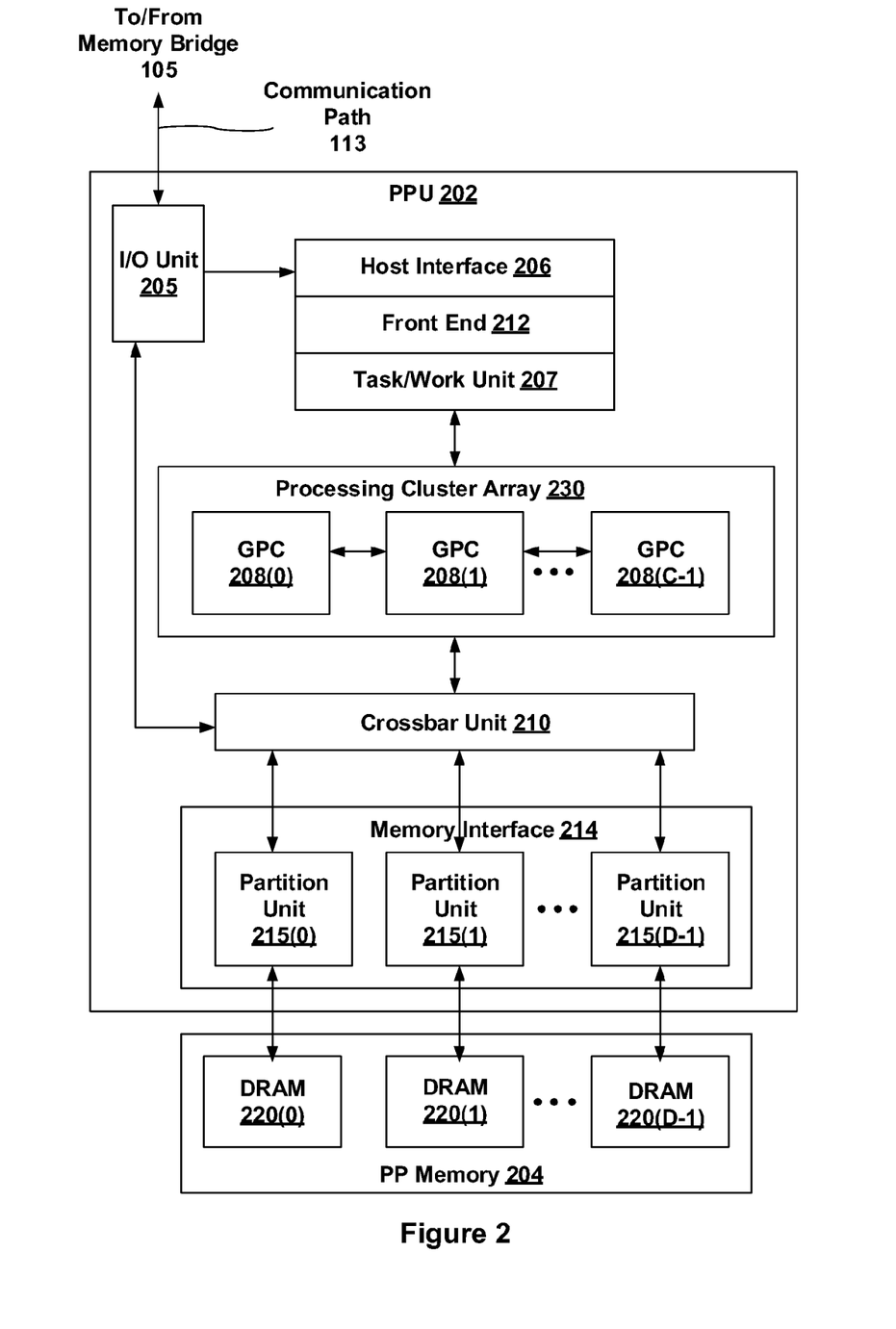
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
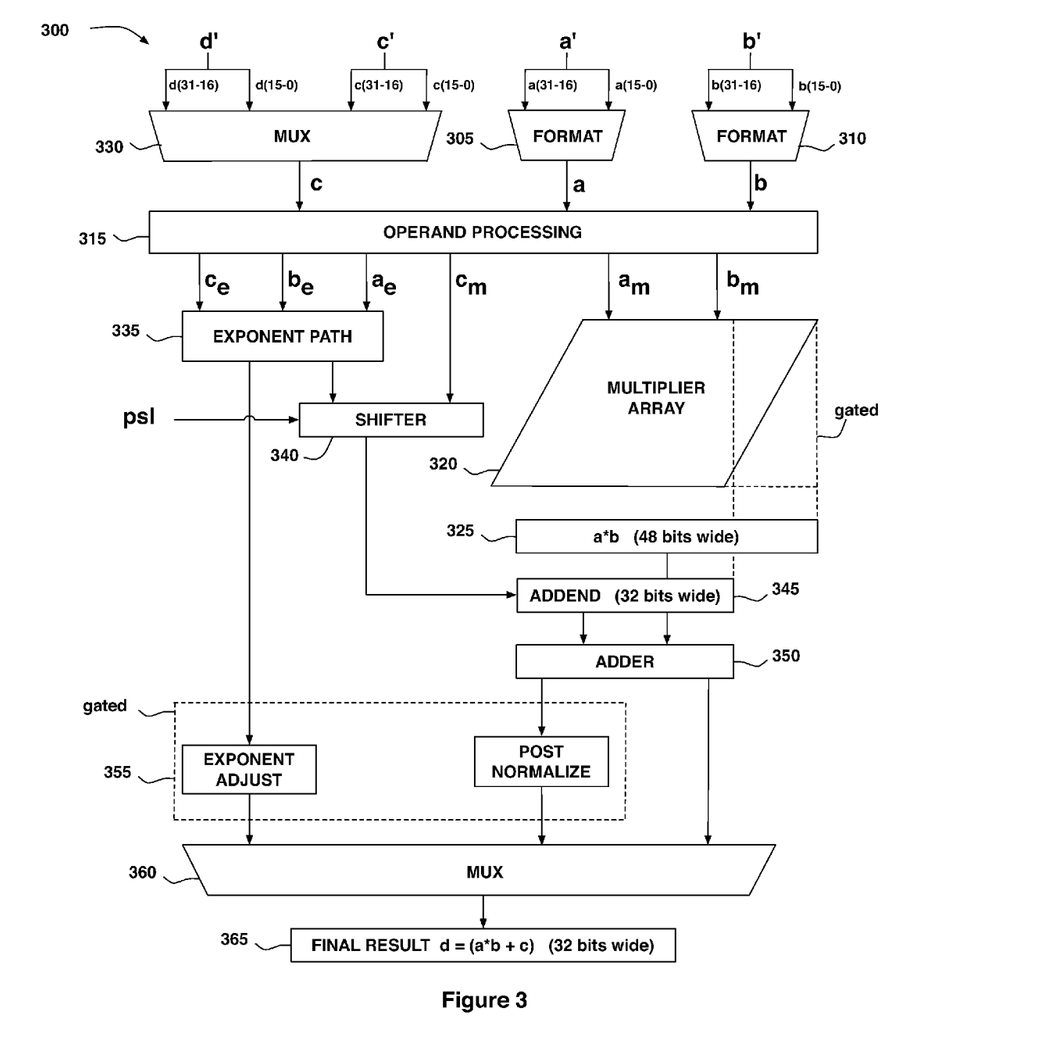
FIG. 3 is a conceptual diagram of an FFMA element, according to one embodiment of the present invention.

Technique for Performing Arbitrary Width Integer Arithmetic Operations Using Fixed Width Elements FIG. 3 is a conceptual diagram of an FFMA element 300, according to one embodiment of the present invention. FFMA element 300 may be included within any portion of computer system 100 of FIG. 1 that is configured to perform integer arithmetic operations. For example, CPU 102 of FIG. 1 or PPU 202 of FIG. 2 may include one or more instances of FFMA element 300. As a general matter, FFMA element 300 may be incorporated into any type of computer device, including server machines, desktop machines, laptop computers, mobile devices, handheld devices, and so forth. The disclosed invention performs multiply-add on arbitrary width integer inputs via multiple passes through the augmented FFMA element 300.

As shown, FFMA element 300 includes formatting elements 305 and 310 and multiplex element 330 connected to operand processing block 315. Multiplier array 320 generates a*b product 325. Exponent path 335 and shifter 340 produce addend 345. Product 325 and addend 345 are inputs of adder 350. Exponent adjust and post normalize elements 355 and multiplex element 360 produce final result 365.

Formatting elements 305 and 310 receive operands a' and b' respectively and position a 16 bit segment of each of the operands for presentation to operand processing element 315. Operand processing element 315 positions the selected 16 bit segments into the upper 16 bits of $a_m$ and $b_m$ respectively. Multiplier array 320 is a 24 bit multiplier, which, as part of the FFMA unit, multiplies the 24 bit mantissas of the inputs. In the disclosed invention, the lower 8 bits are gated off when performing integer multiplication. Multiplier array 320 then yields 32 bit a*b product 325.

Multiplex element 330 accepts addend c' and d' as inputs and selects one of these as addend c. Input d' is the final output of a prior cycle of FFMA element 300. Operand processing 315 forwards the selected input as $c_m$ to shifter 340. In a conventional FFMA element, $a_e$, $b_e$, and $c_e$, would be exponents. In the disclosed invention, however, operand processing 315 formats $a_e$, $b_e$, and $c_e$ to simulate relative exponent difference of zero, which induces a zero shift. Addend c is thus un-shifted and lines up directly under product 325. Software generated input psi (product shift left) overrides the zero exponent shift and induces a fixed 16 bit shift of addend c when required. Shifting addend 345 to the right is the functional equivalent of shifting product 325 to the left.

Adder 350 sums product 325 and addend 345. Exponent adjust and post normalize 355, which format the final output in conventional FFMA mode, are gated off in the disclosed invention. Multiplex element 360 forwards the output of adder 350 to final result 365.

Portions of the output of adder 350 are stored in a temporary register. Portions of final result 365 in the temporary register from a given cycle are fed into the next cycle as input d' in the fashion described above. Portions of multiple cycles are collected in the final result 365 register to generate a final output twice the width of the arbitrary width (that is, arbitrarily large) input operands.

Appropriate software either configures FFMA element 300 as a conventional FFMA or sets FFMA element 300 configuration parameters for arbitrary width integer operation, including formatting, multiplexing, number of cycles, and content of temporary and final output data registers.

Figure 4:
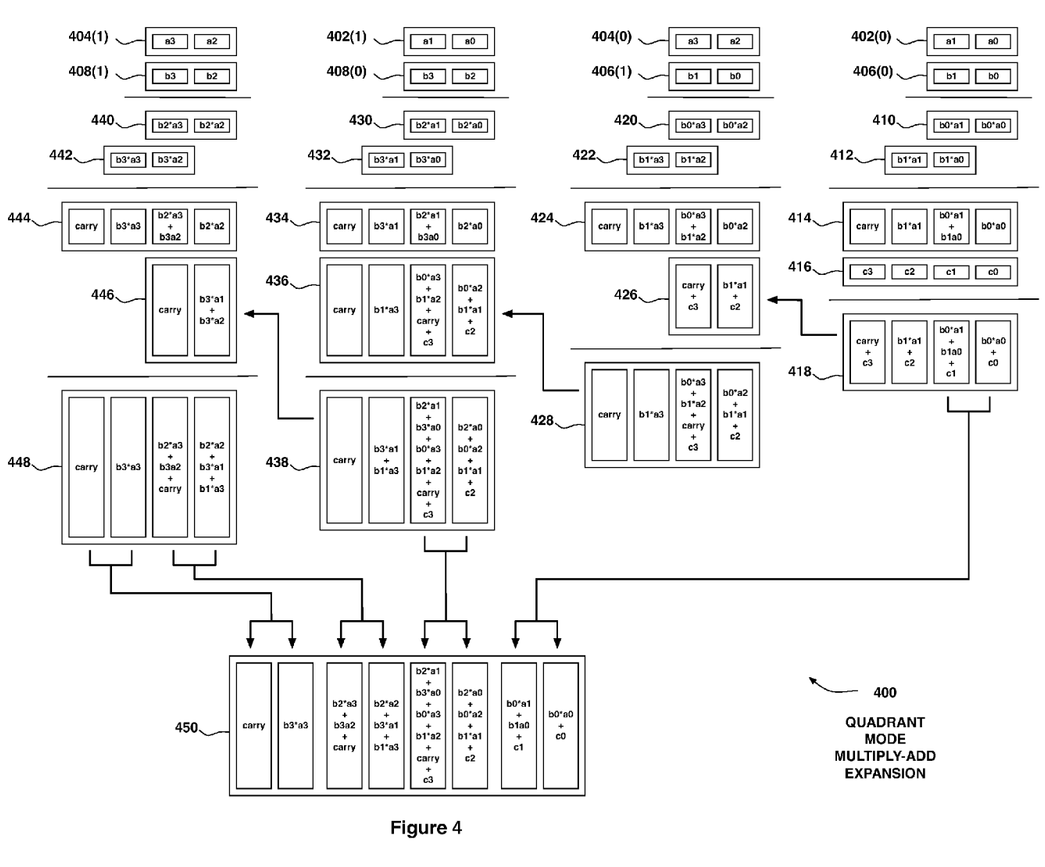
FIG. 4 is a conceptual diagram of an exemplary multiply-add operation on four bit integers in quadrant mode, according to one embodiment of the present invention.

FIG. 4 is a conceptual diagram of an exemplary multiply-add operation on four bit integers in quadrant mode, according to one embodiment of the present invention. More specifically, FIG. 4 shows a complete expansion 400 of a multiply-add operation, performed in quadrant mode on three 4 bit input operands. Two digit element 402(0) is the lower (LSB) two bits of a first four bit integer operand occurring in the first cycle; two digit element 402(1) is the same lower (LSB) two bits of a first four bit integer operand but occurring in the third cycle. Two digit element 404(0) is the upper (MSB) two bits of the first four bit integer operand occurring in the second cycle; two digit element 404(1) is the same upper (MSB) two bits of the first four bit integer operand but occurring in the fourth and final cycle. Two digit element 406(0) is the lower (LSB) two bits of a second four bit integer operand occurring in the first cycle; two digit element 406(1) is the same lower (LSB) two bits of a second four bit integer operand but occurring in the second cycle. Two digit element 408(0) is the upper (MSB) two bits of a second four bit integer operand occurring in the third cycle; two digit element 408(1) is the same upper (MSB) two bits of a second four bit integer operand but occurring in the fourth and final cycle. Four digit element 416 is the third operand.

In the first cycle, two digit elements 402(0) and 406(0) are multiplied to generate partial products 410 and 412, which are added to construct first cycle product 414. Four digit input addend 416 is added to product 414 to construct the first cycle multiply-add result 418. The upper half of result 418 is forwarded as the addend 426 to the second cycle multiply-add. The lower half of result 418 is stored in final output register 450.

In the second cycle, operand portions 404(0) and 406(1) are multiplied to generate partial products 420 and 422, which are added to construct second cycle product 424. The second cycle addend 426 is a portion of the prior result that is shifted to the right. Addend 426 is added to product 424 to construct the second cycle multiply-add result 428. Second cycle result 428 is forwarded as addend 436 to the third cycle multiply-add.

In the third cycle, operand portions 402(1) and 408(0) are multiplied to generate partial products 430 and 432, which are added to construct first cycle product 434. Four digit addend 436 from the prior cycle is added to product 434 to construct the third cycle multiply-add result 438. The upper half of result 438 is forwarded as the addend 446 to the fourth cycle multiply-add. The lower half of result 438 is stored in final output register 450.

In the fourth cycle, operand portions 404(1) and 408(1) are multiplied to generate partial products 440 and 442, which are added to construct first cycle product 444. The fourth cycle addend 446 is a portion of the prior result that is shifted to the right. Addend 446 is added to product 444 to construct the second cycle multiply-add result 448. Fourth cycle result 448 is stored in final output register 450 to complete the operation.

From an inspection of the contents of the individual bits of final result 450, it is evident that performing a quadrant multiply-add operation on the 2 bit components of the three inputs is equivalent to a single cycle four bit multiply-add operation. Persons skilled in the art will understand that the quadrant method can be readily extended to apply to integer operands of width 32, 64, 128, or any arbitrary number of bits.

Figure 5:
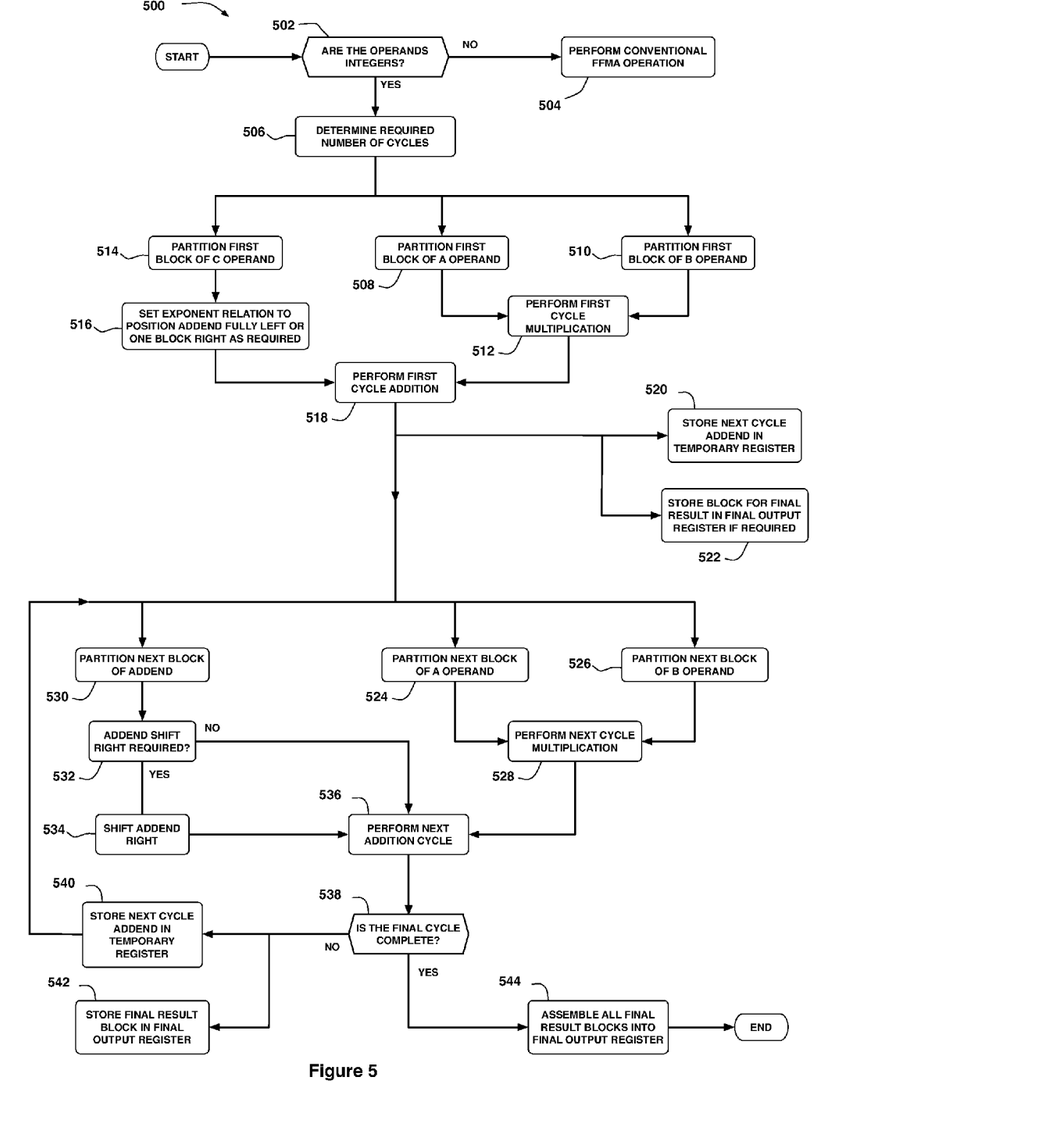
FIG. 5 is a flow diagram of method steps for performing multiply-add operations on arbitrary width integers, according to one embodiment of the present invention.

FIG. 5 is a flow diagram of method steps for performing multiply-add operations on arbitrary width integers, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where formatting elements 305 and 310 determine if the input operands are integers. If the input operands are floating point numbers, FFMA element 300 performs a conventional FFMA operation in step 504. If the input operands are integers, interpreting logic determines, in step 506, the number of cycles required to perform the complete operation.

In step 508, formatting element 305 partitions the first block of the a operand as $a_m$. In step 510, formatting element 310 partitions the first block of the b operand as $b_m$. Multiplier array 320 performs the first cycle multiplication in step 512. In step 514, operand processing 315 partitions the lower (LSB) portion of the c operand as $c_m$. Exponent path 335 sets the relative exponent difference to zero in step 516 so that $c_m$ is positioned directly under a*b product 325. In step 518, adder 350 performs the first cycle addition of product 325 and addend 345. In step 520, multiplex element 360 stores a portion of this intermediate result in a temporary register to provide an addend for the next cycle. Multiplex element 360 further forwards a portion of this intermediate result to the final result 365 in step 522.

In step 524, formatting element 305 partitions the next block of the a operand as $a_m$. In step 526, formatting element 310 partitions the next block of the b operand as $b_m$. Multiplier array 320 performs the next cycle multiplication in step 528. In step 530, operand processing 315 partitions a portion of the next cycle c operand as $c_m$. In step 532, interpreting logic determines if the next cycle addend should be shifted right. If not, adder 350 performs the addition of the next cycle product 325 and addend 345 in step 536. If interpreting logic determines that the next cycle addend should be shifted right, software activates input psi to force the shift in step 534 prior to the step 536 addition. In step 538, interpreting logic determines if the last cycle is complete. If not, in step 540, multiplex element 360 stores a portion of this cycle's intermediate result in a temporary register to provide an addend for the next cycle. Multiplex element 360 further forwards a portion of this intermediate result to the final result 365 register in step 542. If interpreting logic determines that the last cycle is complete, multiplex element 360 assembles the final block in final result 365 register to complete the arbitrary width integer multiply-add operation in step 544.

In sum, interpreting logic examines arbitrary width digital integer input operands and segments them into sectors to allow piecewise multiplication in a fused floating point multiply-add element, which includes a fixed width multiplier. Software coordinates the multiplication of each sector by each of the other sectors to afford a matrix of sub-products. At each constituent multiplication, interpreting logic shifts the appropriate sector of the additive operand input such that it aligns with the appropriate sub-products. Interpreting logic then stores the final addition results successively in a composite register to yield a final multiply-add result.

One advantage of the systems and approach disclosed herein is that a minimally sized multiplier included within an existing FFMA element is used to implement arithmetic operations on signed or unsigned digital integer input operands of arbitrary width using minimal additional microcircuit real estate area and minimal additional overhead power usage.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing integer arithmetic operations, the method comprising:
receiving a plurality of input operands;
segmenting, via a processor, each input operand into multiple sectors;
performing a plurality of multiply-add operations based on the multiple sectors to generate a plurality of multiply-add operation results; and
combining the multiply-add operation results to generate a final result.

2. The computer-implemented method of claim 1 further comprising analyzing the size of each input operand included in the plurality of input operands to determine how many multiply-add operations should be included in the plurality of multiply-add operations.

3. The computer-implemented method of claim 1, wherein performing the plurality of multiply-add operations comprises performing a multiply component of a first multiply-add operation by multiplying a first sector of a first input operand included in the plurality of input operands with a first sector of a second input operand included in the plurality of input operands to generate a first product.

4. The computer-implemented method of claim 3, wherein performing the plurality of multiply-add operations comprises performing an add component of the first multiply-add operation by:
setting a relative exponent difference between the first sector of a third input operand included in the plurality of input operands and the first product to zero in order to align the first sector of the third input operand with the first product; and
adding the first sector of the third input operand to the first product to generate a first partial result.

5. The computer-implemented method of claim 4, wherein performing the plurality of multiply-add operations comprises performing a multiply component of a second multiply-add operation by multiplying a second sector of the first input operand with the first sector of the second input operand to generate a second product.

6. The computer-implemented method of claim 5, wherein performing the plurality of multiply-add operations comprises performing an add component of the second multiply-add operation by:
selecting a portion of the first partial result as an addend for the second multiply- add operation;
setting a relative exponent difference between the addend and the second product to zero in order to align the addend with the second product; and
adding the addend to the second product to generate a second partial result.

7. The computer-implemented method of claim 6, wherein performing the plurality of multiply-add operations comprises performing a multiply component of a final multiply-add operation by multiplying a final sector of the first input operand with a final sector of the second operand to generate a final product.

8. The computer-implemented method of claim 7, wherein performing the plurality of multiply-add operations comprises performing an add component of the final multiply-add operation by:
selecting a portion of a prior result as an addend for the final multiply-add operation;
setting a relative exponent difference between the addend and the final product to zero in order to align the addend with the final product; and
adding the addend to the final product to generate a final partial result.

9. The computer-implemented method of claim 8, wherein combining the multiply-add operation results to generate a final result comprises combining the first partial result, the second partial result, the prior partial result, and the final partial result to generate the final result.

10. A system for performing integer arithmetic operations, the system comprising:
- a plurality of formatting elements, wherein each formatting element is configured to receive one or more input operands;
- an operand processing element configured to segment each input operand into sectors;
- a multiplier array configured to perform a plurality of multiply operations with the sectors of the input operands to generate a plurality of multiply results;
- an adder element configured to perform summing operations based on the plurality of multiply results and one or more addends to generate a plurality of partial results; and
- a multiplex element configured to cause the plurality of partial results to be combined to generate a final result.

11. The system of claim 10, wherein the operand processing element is further configured to analyze the size of each input operand to determine the number of multiply-add operations in the plurality of multiply-add operations.

12. The system of claim 10, wherein the multiplier array is further configured to multiply a first sector of a first input operand with a first sector of a second input operand to generate a first product.

13. The system of claim 12, further comprising:
- an exponent path element and a shifter that are configured to set a relative exponent difference between the first sector of a third input operand and the first product to zero in order to align the first sector of the third input operand with the first product,
- wherein the adder element is further configured to add the first sector of the third input operand to the first product to generate a first partial result.

14. The system of claim 13, wherein the multiplier array is further configured to multiply a second sector of the first input operand with the first sector of the second input operand to generate a second product.

15. The system of claim 14, further comprising:
- a second multiplex element configured to selecting a portion of the first partial result as an addend,
- wherein the exponent path element and the shifter are further configured to set a relative exponent difference between the addend and the second product to zero in order to align the addend with the second product, and
- wherein the adder element is further configured to add the addend to the second product to generate a second partial result.

16. The system of claim 15, wherein the multiplier array is further configured to multiply a final sector of the first input operand with a final sector of the second operand to generate a final product.

17. The system of claim 16, wherein:
- the second multiplex element is further configured to select a portion of a prior result as an addend,
- the exponent path element and the shifter are further configured to set a relative exponent difference between the addend and the final product to zero in order to align the addend with the final product, and
- the adder element is further configured to add the addend to the final product to generate a final partial result.

18. The system of claim 10, wherein the multiplex element is further configured to cause the partial result, the second partial result, the prior partial result, and the final partial result to be combined to generate the final result.

19. A computing device, including:
- a memory;
- a processing unit coupled to the memory and including a subsystem configured to perform integer arithmetic operations, the subsystem having:
  - a plurality of formatting elements, wherein each formatting element is configured to receive one or more input operands;
  - an operand processing element configured to segment each input operand into sectors; and
  - one or more elements configured to perform a plurality of multiply-add operations on the sectors to generate a plurality of results.

20. The computing device of claim 19, wherein the processing element comprises a central processing unit, a parallel processing unit, or a graphics processing unit.

21. The computing device of claim 19, wherein the plurality of results comprises a plurality of partial results, and the one or more elements comprise:
- a multiplier array configured to perform a plurality of multiply operations with the sectors of the input operands to generate a plurality of multiply results; and
- an adder element configured to perform summing operations based on the plurality of multiply results and one or more addends to generate the plurality of partial results,
- wherein the subsystem further comprises:
  - a multiplex element configured to cause the plurality of partial results to be combined to generate a final result.

* * * * *

UNITED STATES PATENT AND TRADEMARK OFFICE
CERTIFICATE OF CORRECTION

| | | |
|---|---|---|
| PATENT NO. | : 9,600,235 B2 | |
| APPLICATION NO. | : 14/026829 | |
| DATED | : March 21, 2017 | |
| INVENTOR(S) | : Srinivasan Vasu Iyer, Michael Alan Fetterman and David Conrad Tannenbaum | |

It is certified that error appears in the above-identified patent and that said Letters Patent is hereby corrected as shown below:

On the Title Page

Inventors (72):
Please delete "Srinivasan Iyer" and insert --Srinivasan (Vasu) Iyer-- therefor.

Signed and Sealed this
Twenty-sixth Day of December, 2017

Joseph Matal
*Performing the Functions and Duties of the
Under Secretary of Commerce for Intellectual Property and
Director of the United States Patent and Trademark Office*